United States Patent
Panchaksharaiah et al.

(10) Patent No.: US 9,898,490 B2
(45) Date of Patent: Feb. 20, 2018

(54) SYSTEMS AND METHODS FOR SUPPORTING MULTIPLE DATABASE SERVER VERSIONS ON A DATABASE MACHINE

(71) Applicant: Oracle International Corporation, Redwood Shores, CA (US)

(72) Inventors: Umesh Panchaksharaiah, Richmond, CA (US); Krishnan Meiyyappan, Fremont, CA (US); Kothanda Umamageswaran, Sunnyvale, CA (US); Alex Tsukerman, Foster City, CA (US); Semen Ustimenko, Sunnyvale, CA (US); Adrian Ng, Redwood City, CA (US); Devang Mundhra, San Mateo, CA (US); Yinian Qi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 361 days.

(21) Appl. No.: 14/313,984

(22) Filed: Jun. 24, 2014

(65) Prior Publication Data

US 2015/0088880 A1 Mar. 26, 2015

Related U.S. Application Data

(60) Provisional application No. 61/880,821, filed on Sep. 20, 2013.

(51) Int. Cl.
*G06F 17/30* (2006.01)
(52) U.S. Cl.
CPC .. *G06F 17/30339* (2013.01); *G06F 17/30289* (2013.01)

(58) Field of Classification Search
USPC .................................................. 707/609–788
See application file for complete search history.

(56) References Cited

U.S. PATENT DOCUMENTS

2008/0281784 A1  11/2008  Zane et al.
2010/0122026 A1*  5/2010  Umamageswaran . G06F 12/084
                                                          711/113

(Continued)

FOREIGN PATENT DOCUMENTS

WO    WO 2012/032184 A1    3/2012

OTHER PUBLICATIONS

U.S. Appl. No. 13/840,811, filed Mar. 15, 2013, Interview Summary, Apr. 27, 2015.

(Continued)

*Primary Examiner* — Hosain Alam
*Assistant Examiner* — Tuan-Khanh Phan
(74) *Attorney, Agent, or Firm* — Hickman Palermo Becker Bingham LLP (57) ABSTRACT

Techniques are described herein for supporting multiple versions of a database server within a database machine comprising a separate database layer and storage layer. In an embodiment, the database layer includes compute nodes each hosting one or more instances of a database server. The storage layer includes storage nodes each hosting one or more instances of a storage server, also referred to herein as a "cell server." In general, the database servers may receive data requests, such as SQL queries, from client applications and service the requests in coordination with the cell servers of the storage layer.

16 Claims, 6 Drawing Sheets

(56) References Cited

U.S. PATENT DOCUMENTS

| | | |
|---|---|---|
| 2011/0016157 A1 | 1/2011 | Bear et al. |
| 2011/0029569 A1 | 2/2011 | Ganesh et al. |
| 2011/0137940 A1 | 6/2011 | Gradin et al. |
| 2012/0173515 A1 | 7/2012 | Jeong et al. |
| 2012/0173774 A1* | 7/2012 | Lee ................... G06F 3/0611 710/39 |
| 2014/0281247 A1 | 9/2014 | Loaiza et al. |

OTHER PUBLICATIONS

Dittrich et al., "Towards a One Size Fits All Database Architecture" Proceedings of the 5th Biennial Conference on Innovative Data Systems Research, dated Jan. 6, 2011, 4 pages.

W3Schools "SQL Update Statement", Wayback Machine darted Apr. 19, 2012, on the internet www.w3schools.com/sql/sql_update.asp>, 1 page.

U.S. Appl. No. 13/840,811, filed Mar. 15, 2013, Final Office Action, Jul. 15, 2015.

U.S. Appl. No. 13/841,811, filed Mar. 15, 2013, Office Action, Jan. 12, 2015.

Loaiza, U.S. Appl. No. 13/840,811, filed Mar. 15, 2013, Final Office Action, dated Jul. 5, 2017.

\* cited by examiner

SYSTEMS AND METHODS FOR SUPPORTING MULTIPLE DATABASE SERVER VERSIONS ON A DATABASE MACHINE

CROSS-REFERENCE TO RELATED APPLICATIONS; BENEFIT CLAIM

This application claims the benefit of U.S. Provisional Application No. 61/880,821, filed Sep. 20, 2013, the entire contents of which is hereby incorporated by reference as if fully set forth herein, under 35 U.S.C. § 119(e).

This application is related to U.S. patent application Ser. No. 13/840,811, entitled A Method To Accelerate Queries Using Dynamically Generated Alternate Data Formats In Flash Cache, filed by Juan Loaiza, et al., on Mar. 15, 2013, the contents of which are incorporated herein by reference.

FIELD OF THE INVENTION

The present invention relates to database machines that include a database layer and a storage layer and, more specifically, to a storage layer configured for efficiently processing requests received from database servers of different versions.

BACKGROUND

Database servers generally may be thought of as comprising two layers: a database layer and a storage layer. The database layer is responsible for receiving and interpreting requests from users and applications (e.g., SQL queries) and for performing manipulations and other operations on data identified in the requests. The storage layer, on the other hand, is generally responsible for storing, modifying, and accessing data on one or more storage devices.

Typically, the storage layer of a database server is tightly coupled to the database layer. For example, database servers are commonly configured as unitary applications that are capable of receiving requests, accessing any relevant data from storage, and performing any request-specific operations on the data. However, recent advances in database technology have included the introduction of so-called "database machines" that, among other features, provide a more distinct separation between the database layer and the storage layer. An example of such a database machine is the Exadata database machine available from Oracle Corporation.

One benefit of separating the storage layer from the database layer is the ability for the storage layer to more efficiently implement certain functionality that might normally be handled by the database layer. This functionality is generally referred to herein as "smart functionality." For example, smart functionality may include operations such as scans, incremental backup, file creation, or any other operations that may be performed by the storage layer of a database machine on behalf of the database layer.

Another benefit provided by database machines is the ability to consolidate multiple database servers into a single database machine. For example, different departments within a large business organization may each separately develop database applications on separate hardware. A database machine is capable of simultaneously hosting each of the separately developed database applications, thereby reducing the overall amount of hardware for which the business organization is responsible.

Presently, storage server software that runs on the storage layer of database machines is configured to support a particular version of database server software running in the database layer. This is due in part to the communication that occurs between the database layer and the storage layer to coordinate the execution of requests. For example, each database server version may be implemented to communicate using a particular set of data structures, messaging protocols, and other version-specific characteristics specific to that database server version.

One possibility for supporting multiple versions of a database server within a database machine is to vertically partition the storage layer such that a separate partition is created for each version of a database server for which support is desired. In this manner, each database server could communicate with only the storage layer partition corresponding to the version of the database server. However, vertical partitioning of the storage layer may result in ineffective usage of the shared resources available to the storage layer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for supporting multiple versions of a database server within a database machine comprising a separate database layer and storage layer. In an embodiment, a database layer includes compute nodes each hosting one or more instances of a database server. A storage layer includes storage nodes each hosting one or more instances of a storage server, also referred to herein as a "cell server." In general, the database servers may receive data requests, such as SQL queries, from client applications and service the requests in coordination with the cell servers of the storage layer.

A cell server services two kinds of requests from database servers: "block mode requests" and "smart requests." Block mode requests are serviced by a cell server by retrieving from storage data blocks containing the data identified by the block mode requests. Smart requests are serviced by performing, at the storage layer and before the data blocks are returned to the database layer, various operations on data contained in data blocks retrieved from storage by a cell server. As an example, a cell server may service a particular smart request from a database server by retrieving one or more relevant data blocks from storage and causing data in the data blocks to be filtered according to filtering criteria specified in the smart request.

In an embodiment, database servers hosted by a database machine may be each associated with a particular "version." As used herein, a "version" of a database server or other component refers to a particular state of the software implementing the functionality of the component. Among other differences, each separate version of a database server may, or may not, have a unique set of data structures, messaging protocols, and other version-specific characteristics that define how the database server communicates with cell servers to coordinate the execution of block mode requests and smart requests.

Accordingly, in order for a cell server to service requests from a particular database server, the cell server generally is configured to communicate with the particular version of the database server software. However, configuring cell servers for compatibility with only a particular database server version may limit the ability to consolidate database servers of different versions into a single database machine.

In order to facilitate the consolidation of database servers onto a single database machine, a cell server is configured to service requests from database servers of different database server versions. Each database server version may, for example, be associated with a separate implementation of smart requests. In one embodiment, for each particular database server version to be supported by the database machine, a separate "offload server" may be configured to service smart requests for the particular database server version. The cell server receives and services both block mode requests and smart requests; however, smart requests may be delegated for processing to an appropriate offload server based on the database server version or other characteristics of the database server making the request.

In one embodiment, offload servers may be logically grouped into "offload groups." An offload group represents one or more offload servers that are configured to implement the same version of smart functionality. For example, if database servers of version "v2" are to be hosted in the database layer, and database servers of version "v2" are compatible with smart functionality of version "v2," then an offload group comprising offload servers implementing smart functionality of version "v2" may be created to service smart requests from those database servers.

In an embodiment, user defined offload groups may be created to diagnose issues in the operation of a database machine or to test updated smart functionality implementations. For example, a user may create, or be provided with, a modified version of a particular offload server that includes additional debugging functionality to assist the user in diagnosing issues with the operation of the particular offload server. The modified offload server may be deployed and associated with a user defined diagnostic offload group. The cell server may then be configured to route requests associated with a particular database server or database session to the custom diagnostic offload group to enable the user to diagnose operation of the smart functionality. By enabling users to define custom offload groups and to route certain database workloads to a user defined offload group, smart functionality may be diagnosed and tested without disrupting other workloads on the database machine.

Example Database Machine

Figure 1:
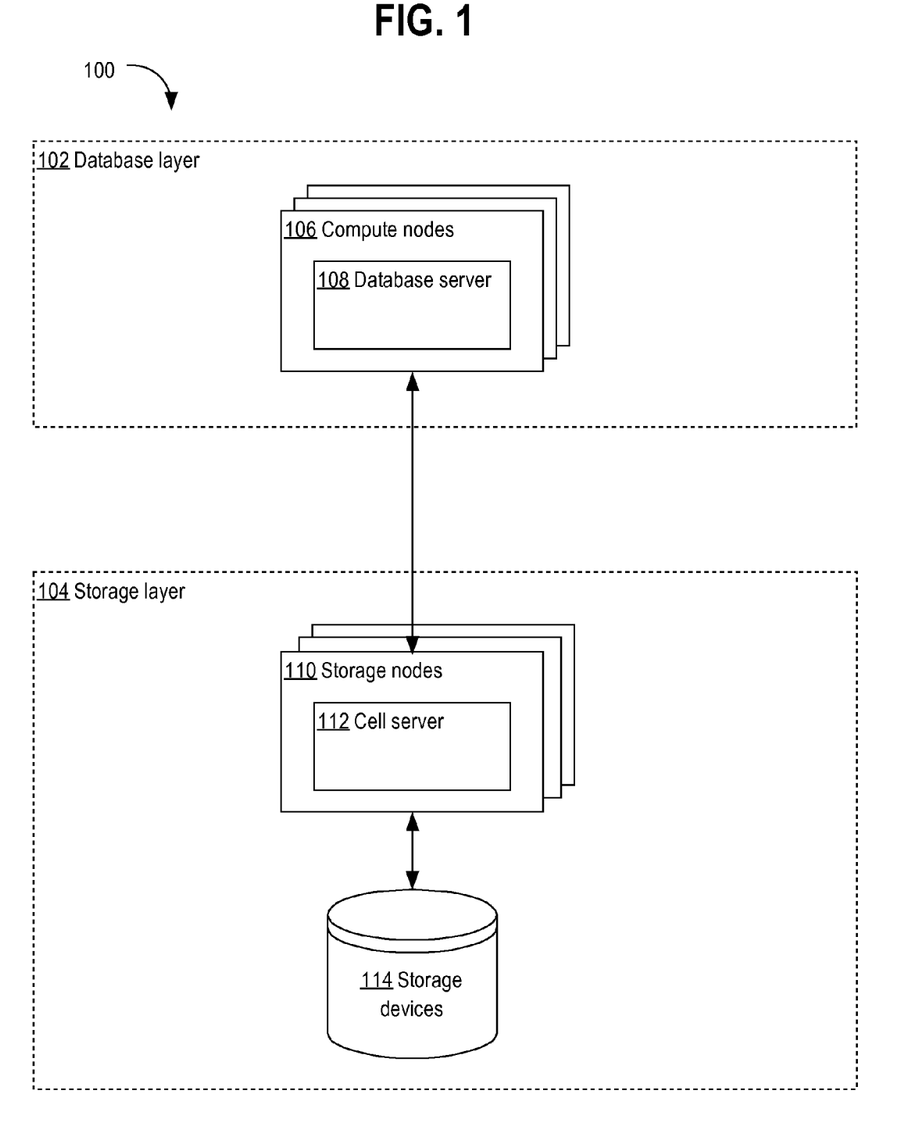
FIG. 1 is a block diagram that depicts an example database machine architecture, according to an embodiment of the invention.

FIG. 1 is a block diagram of a database machine 100 on which the techniques described herein may be implemented. In an embodiment, database machine 100 includes a database layer 102 and a storage layer 104.

In an embodiment, database layer 102 includes one or more compute nodes 106. Each compute node 106 may host one or more instances of a database server 108. A database server 108 generally is configured to receive requests, such as SQL requests, from client applications and to service the requests in coordination with storage layer 104.

In an embodiment, storage layer 104 comprises one or more storage nodes 110. Each storage node 110 hosts a "database aware" cell server 112 that is configured to service requests received from a database server 108. A cell server 112 is configured to provide block mode access to data stored on storage devices 114. Block mode access provides a client, such as a database server 108, access to data stored on one or more storage devices 114 in units referred to as a data block.

In an embodiment, a cell server 112 is further configured to cause certain operations that typically may be performed by a database server (e.g., row filtering based on a predicate) to be performed by the storage layer 104 before returning the data to the requesting database server. The implementation of such processes by a cell server 112 is referred to herein as "smart functionality."

Smart Functionality

As indicated above, a database machine 100 may be configured such that certain database operations typically performed by a database server 108 instead may be performed by one or more components of storage layer 104. A database server 108 may request that such operations be performed by components of the storage layer 104 in a "smart request."

For example, consider a request from a client application for data stored in a database table where the request includes a predicate on one or more columns of the database table. Typically, a database server 108 receiving the request may retrieve all database blocks from storage storing the database table, examine the rows of the table contained in retrieved database blocks, and discard any rows from the database table that do not match the predicate. Particularly as the database table grows in size, processing a request in this manner may be expensive because all of the database blocks for the table are retrieved from storage and placed into memory for evaluation of the predicate by the database server.

Using smart functionality, a database server 108 receiving the example request above may instead send a smart request to a cell server 112 of storage layer 104. In response, a cell server 112 may service the smart request by retrieving the requested data from storage devices 114, filtering the retrieved data according to the predicate at the storage layer 104, and returning to the database server only the relevant rows and columns. By configuring one or more components of storage layer 104 to perform certain operations, less data may be sent between the storage layer 104 and the database layer 102 during request processing, thereby increasing the overall performance of the database machine 100.

Figure 2A:
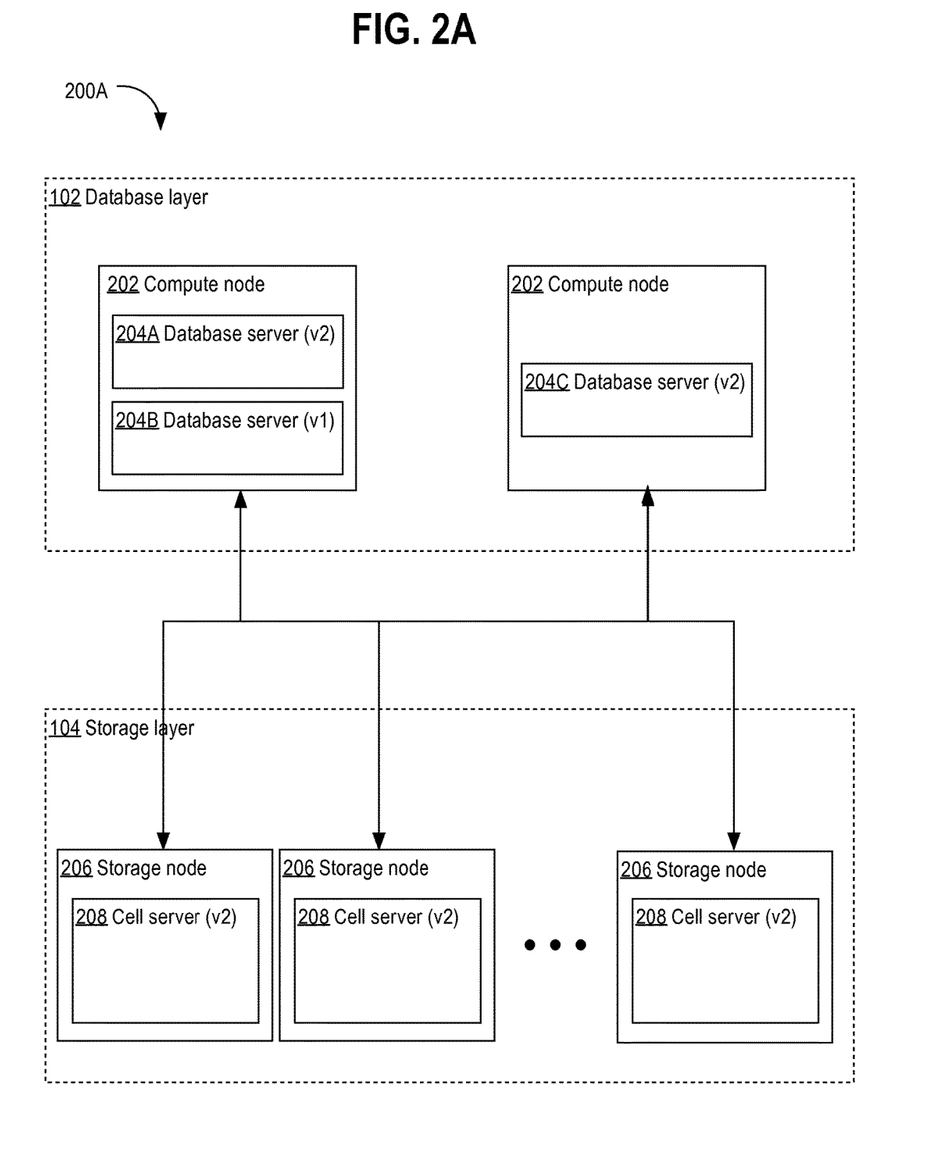
FIG. 2A is a block diagram of an example database machine including a storage layer configured to service smart requests, according to an embodiment of the present invention.

FIG. 2A is a block diagram of an example database machine 200A including a storage layer configured to service smart requests, according to an embodiment. In FIG. 2A, compute nodes 202 include database servers 204A, 204B, 204C. In the example of FIG. 2A, database server 204B is associated with a version "v1," while database servers 204A and 204C are associated with a version "v2." Each of database server versions "v1" and "v2" may, for example, be associated with separate and incompatible smart functionality implementations.

Storage nodes 206 each include a cell server 208 configured to service requests from database servers 204A, 204B, 204C. As indicated above, each database server version may be associated with a unique set of data structures, messaging protocols, and other version-specific characteristics that define how database servers 204A, 204B, 204C communicate with cell servers 208 to coordinate execution of smart requests. Thus, a cell server may be configured to implement a particular version of smart functionality that is compatible with a particular database server version. In FIG. 2A, for example, cell servers 208 are associated with a version "v2" indicating that the cell servers are configured to service smart requests from database servers associated with version "v2."

Because cell servers 208 are configured to service smart requests received database servers associated with the particular version "v2" (e.g., database servers 204A, 204C), cell servers 208 may be unable to service smart requests from database servers of other versions (e.g., database server 204B of version "v1"). In one embodiment, if a cell server 208 is not configured to service smart requests received from a database server of a particular version, the cell server 208 may instead service such smart requests as block mode requests, i.e., without additional smart functionality processing at the storage layer 104. The cell server 208 may indicate to the requesting database server that the cell server was unable to perform the smart functionality and, thus, that the requesting database server is responsible for processing the retrieved data. Configuring a cell server to operate in this manner enables database machine 200A to operate with multiple database server versions; however, such a configuration limits the number of database server versions that are able to take advantage of smart functionality at the storage layer.

Figure 2B:
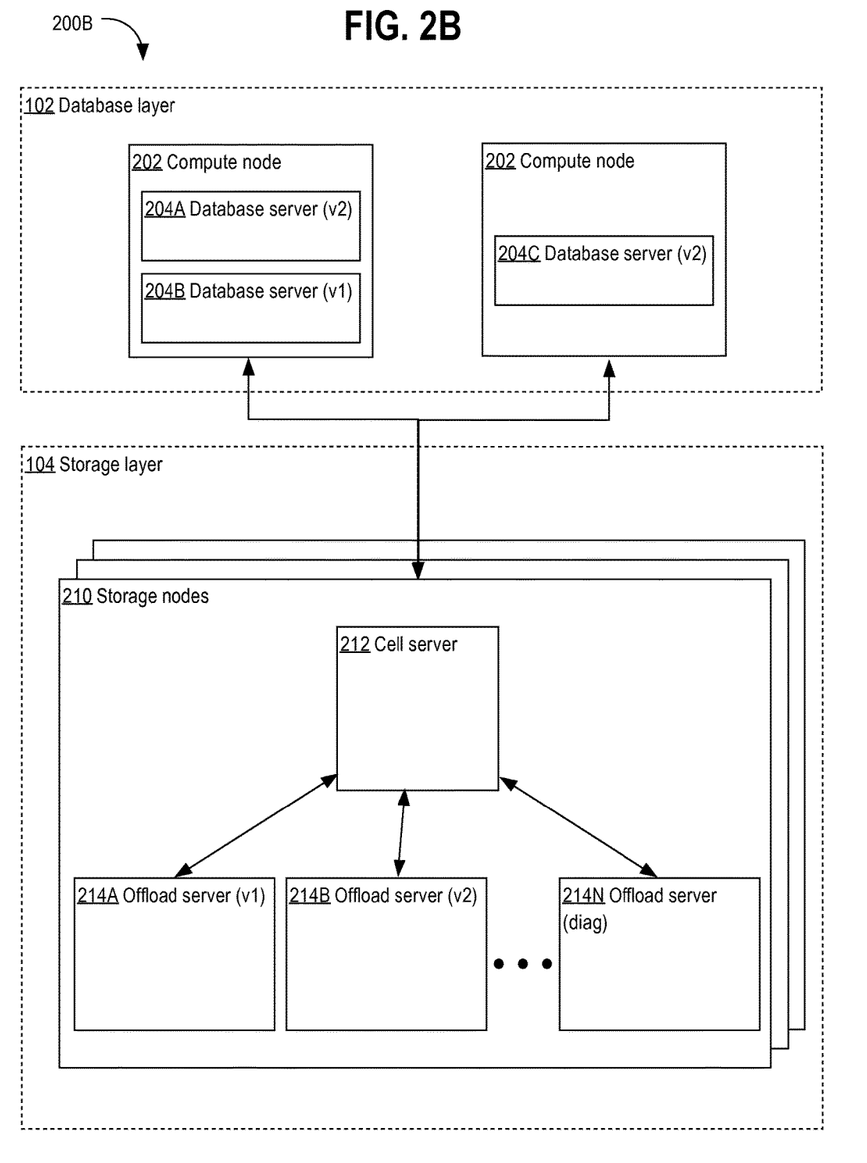
FIG. 2B is a block diagram of an example database machine including a storage layer configured to service smart requests from multiple database server versions, according to an embodiment of the present invention.

In an embodiment, a cell server can be optimized to service smart requests for multiple database server versions, as shown in FIG. 2B. In FIG. 2B, an example database machine 200B includes storage nodes 210. In an embodiment, each storage node 210 includes a cell server 212 and one or more offload servers 214A-214N. Offload servers 214A-214N represent separate processes executing on a storage node 210 and that may perform smart functionality on behalf of the cell server 212.

In an embodiment, each offload server 214A-214N implements smart functionality that may be compatible with one or more particular versions of database servers 204A-204C. For example, offload server 214A is illustrated as implementing smart functionality of version "v1" and which may be configured to process smart requests received from a database server of version "v1" (e.g., database server 204A). Similarly, offload server 214B is illustrated as implementing smart functionality of version "v2" and which may be configured to process smart requests received from a database server of version "v2" (e.g., database servers 204A, 204C). Offload server 214N is an example of an offload server that may be created by a user to diagnosis or test the operation of certain smart functionality, described in more detail in a separate section herein.

Although in the example described above, a database server of version "v1" is compatible with an offload server of version "v1" and a database server of version "v2" is compatible with an offload server of version "v2," a one-to-one correspondence between database server versions and offload server versions may not exist. Multiple database server versions may be compatible with the same version of smart functionality implemented by a cell server. As an example, database servers of version "v1" and "v2" may both be compatible with the same version of smart functionality depending on the changes that were introduced between database server versions. In an embodiment, each database server may indicate a version of smart functionality with which the database server is compatible when establishing a connection with a cell server.

Although not illustrated in FIG. 2B, a communication infrastructure is configured between a cell server 212 and offload servers 214A-214N. In an embodiment, the communication infrastructure may include various data structures (e.g., input buffers, output buffers, etc.) that are stored in shared memory provided on a storage node 210 and that facilitate communication between a cell server 212 and offload servers 214A-214N.

Managing Offload Server Instances

In an embodiment, offload servers are configured as individually installable software packages that enable particular offload servers to be installed, modified, and removed from storage nodes without significant interruption to the overall operation of a database machine. For example, because offload servers are configured as separately installable and executable packages, an offload server may be installed on a storage node while the cell server continues to process requests received from database servers. In one embodiment, offload servers are packaged using the .rpm file format supported by the RPM Package Manager (RPM).

In an embodiment, installation of an offload server on a storage node causes the offload server to register itself with the cell server running on the storage node. For example, an installed offload server may provide information to the offload server indicating a version of smart functionality supported by the offload server. The cell server may store this information in a table mapping a smart functionality version to a particular offload server. In this manner, if the cell server receives a request from a database server requesting a particular version of smart functionality, the cell server can identify an appropriate offload server by consulting the mappings.

Offload Groups

In an embodiment, one or more offload servers may be associated with an "offload group." In this context, an offload group refers to one or more offloaded server instances that are configured to implement the same version of smart functionality and for which memory may be allocated that is protected from other offload groups. An offload group may be identified by a name, for example, corresponding to a particular smart functionality version or representing a user-specified label for the offload group.

In one embodiment, offload groups may either by system defined or user defined. A system defined offload group may be created to identify one or more offload servers that implement a particular version of smart functionality. For example, in response to installation of an offload server on a storage node, a system defined offload group may be automatically created corresponding to the version of smart functionality implemented by the offload server.

A user-defined offload group represents one or more offload servers that are associated with a user-specified name and that may be created to process requests from a particular database server, database server session, database user, etc., or one or more groupings thereof. A user may create a user defined offload group, for example, in order to provide an isolated environment to test particular database workloads.

In an embodiment, a smart request received by a cell server is delegated to a single offload group. For example, if a cell server receives a smart request from a database server requesting a particular smart functionality version, the cell server may delegate performance of the smart functionality to an offload group that is associated with the particular smart functionality version. The cell server may select an appropriate offload group, for example, by examining the mapping between smart functionality versions and offload servers created during installation of an offload server. As another example, a cell server may select an appropriate offload group based on a user mapping between an offload group and a particular database server, database session, database user, etc.

In an embodiment, the offload servers associated with an offload group may be dynamically started, stopped, and restarted based on smart requests received by a cell server. The offload server processes associated with a particular offload group may not be started until the cell server receives a smart request requesting the smart functionality associated with the particular offload group. For example, in response to receiving a smart request from a database server requesting a particular version of smart functionality, the cell server may determine if an offload group for that version of smart functionality is running. If an offload group is not currently running, the cell server may start system defined offload group for that version.

In an embodiment, if an offload group is idle (i.e., the offload group has not received a request to perform smart functionality) for a specified period of time, the offload group may be automatically shut down by the cell server. In an embodiment, commands may be available that enable a user to view all existing offload groups, create or delete user-defined offload groups, and start and stop execution of particular offload groups.

Memory Management

As indicated above, each offload group may be associated with memory that is protected from corruption from other offload groups. In general, the available memory on a storage node is shared by processes hosted by the storage node, including the cell server and offload groups. In an embodiment, a memory allocation facility is provided that enables a cell server and offload groups to dynamically request and be allocated memory that is protected from corruption by other offload groups. In this manner, errors that may arise in the operation of one offload group may be prevented from writing into, and possibly corrupting, the memory allocated to another offload group.

Illustrative Operation

Figure 3:
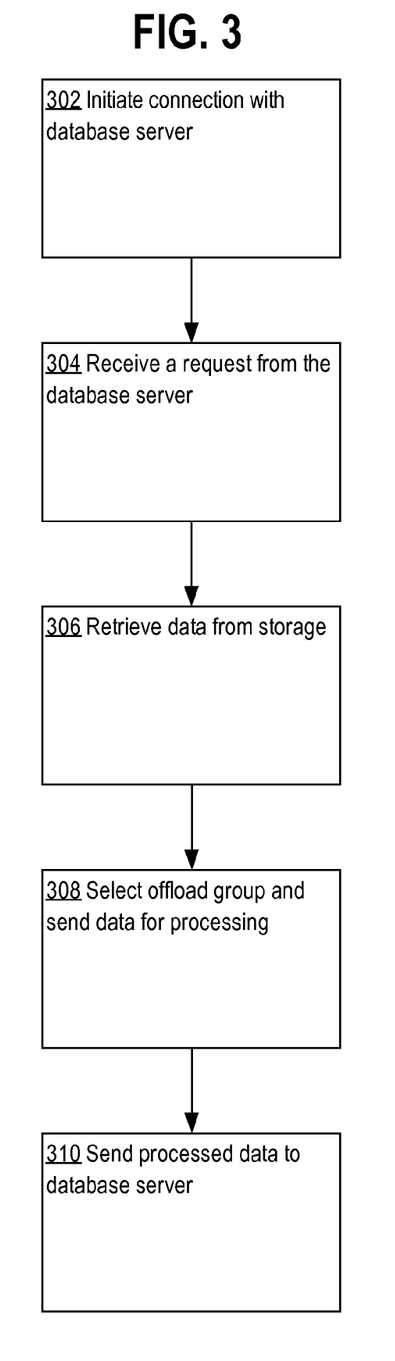
FIG. 3 is a flow diagram for processing a smart request, according to an embodiment of the present invention.

FIG. 3 depicts a procedure performed during processing of a smart request by a cell server, according to an embodiment of the techniques described herein. In FIG. 3, a database server initiates a connection with a cell server (Step 302). When a database server initiates a connection with a cell server, the database server may send information about the database server to assist the cell server is processing smart requests received from the database server. For example, a database server may send information indicating a database server version of the database and a version of the smart functionality associated with the database server. As another example, a database server may send a particular offload group name indicating a particular offload group to process smart requests from the database server.

In an embodiment, in response to receiving information from a database server during the initiation of a connection, a cell server may store the information in a client descriptor that includes, among other information, a mapping between the database server and a particular offload group. If connecting database server does not specify a particular offload group, the cell server may determine a system offload group that is configured to service smart requests from for the smart functionality version specified by the database server.

After a connection is initiated with a database server, a cell server may receive a request from the database server (Step 304). For example, the request may be a smart request generated in response to the database server receiving a query or other request from a client application. The cell server examines the request to determine information about the database server from which the request is received. For example, the request may include information identifying the particular database server generating the request, a database session associated with the user, a user generating the request, etc.

In an embodiment, the cell server retrieves data from storage based on the request (Step 306). For example, in order to service request, data may be retrieved by the cell server from data storage. The data may be certain data blocks that contain information associated with the request and that are requested for further manipulation.

The cell server selects an offload group and sends the retrieved data for processing by the offload group (Step 308). In an embodiment, the cell server may select a particular offload group based on characteristics associated with the particular database server, database session, or database user associated with the request. For example, the cell server may determine that the database server sending the request has indicated that it is compatible with smart functionality of version "v2." In response, the cell server may select and send the retrieved data for processing by an offload group that is configured to implement smart functionality of version "v2."

As another example, if a user has specified a user defined offload group, the cell server may send the data for processing to the user defined offload group. For example, a user may have specified that smart requests sent as part of a particular database session are to be processed by a diagnostic offload group named "diag." In the example, the cell server may examine the request and determine that the request is associated with the particular database session and, in response, send the data to the "diag" offload group for processing.

The data processed by the selected offload group is sent back to the database server (Step 310). In an embodiment, the offload group processing the data may place the processed data in an output buffer that is accessible to the cell server. The cell server may retrieve the processed data from the output buffer and send the data back to the requesting database server.

Figure 4:
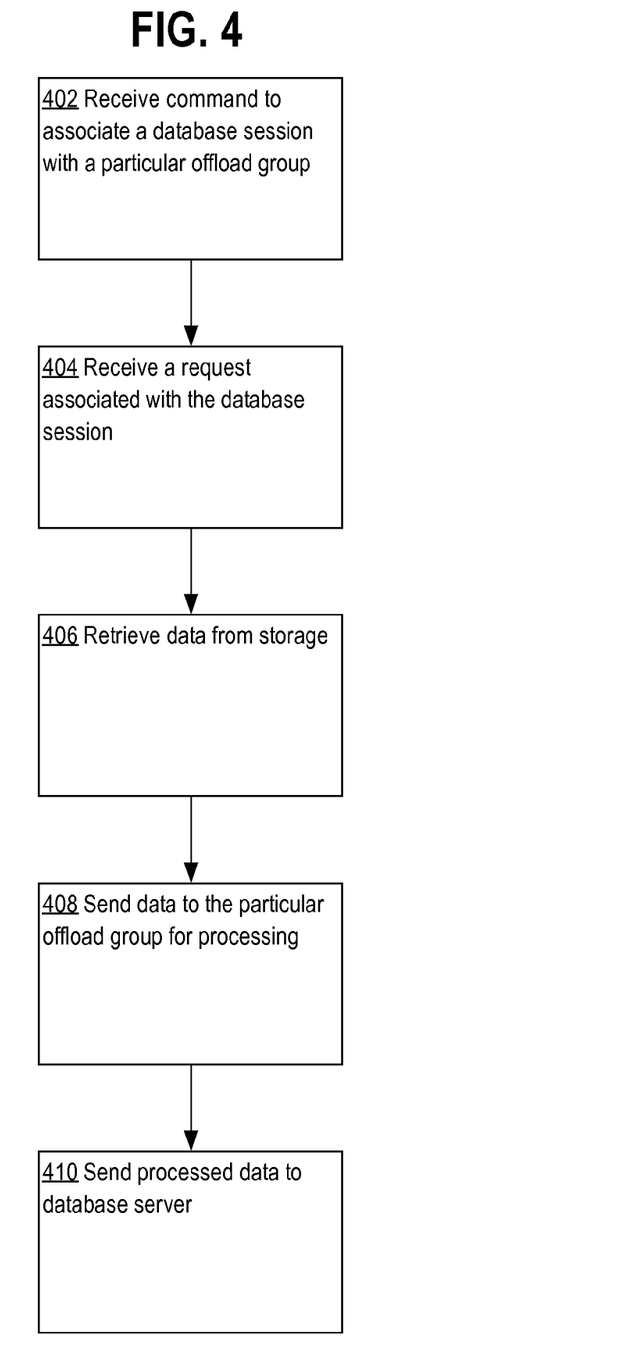
FIG. 4 is a flow diagram for associating a database session with a particular offload group, according to an embodiment of the present invention.

FIG. 4 depicts a procedure for associating a database session with a particular offload group (e.g., a user defined offload group). In an embodiment, the procedure depicted in FIG. 4 generally may be performed at any time during the execution of a database machine. For example, a user may detect that an error is occurring during the processing of certain smart requests and, in response, create and deploy a user defined diagnostic offload group to debug the error, as described above.

In FIG. 4, a command is received to associate a database session or other characteristic of a database server with a particular offload group (Step 402). In one embodiment, the command may be received by a database server the form of an "alter session" command specifying values for one or more parameters related to the current database session.

For example, a user may create a diagnostic offload group named "Diag v2" to debug the operation of offload servers on a database machine implementing smart functionality of "v2." In order to route certain requests to the new diagnostic offload group, a user may indicate that smart requests issued during a particular database session are to be routed to the diagnostic offload group. An example command may specify the following: alter session set cell_offloadgrp_name="Diag v2". In the example command, "Diag v2" may represent the name of the new diagnostic offload group created by the user. In response to receiving the command, a database server may store information mapping the particular database session to the diagnostic offload group in a client descriptor or other location. In an embodiment, the mapping may persist only for the duration of the particular database session.

In one embodiment, an "alter system" command may be received to associate a particular database with an offload group across database sessions. For example, a user may issue a command such as alter system set cell_offloadgroup_name="Diag v2". In response to receiving the command, the database server may send a mapping to the cell server and the cell server may store the mapping information in a client descriptor.

A smart request that is associated with the database session is received (Step 404). The cell server retrieves data from storage based on the request (Step 406). The retrieved data is then sent to the particular offload group for processing (Step 408). For example, the retrieved data may be sent to a particular diagnostic offload group created by a user to test certain functionality for the particular database session. The diagnostic offload group may process the data and cause additional debug statements or other information to be available for diagnosing the operation of the smart functionality implemented by the diagnostic offload group. The cell server receives the processed data from the particular offload server and sends the processed data to the database server (Step 410).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
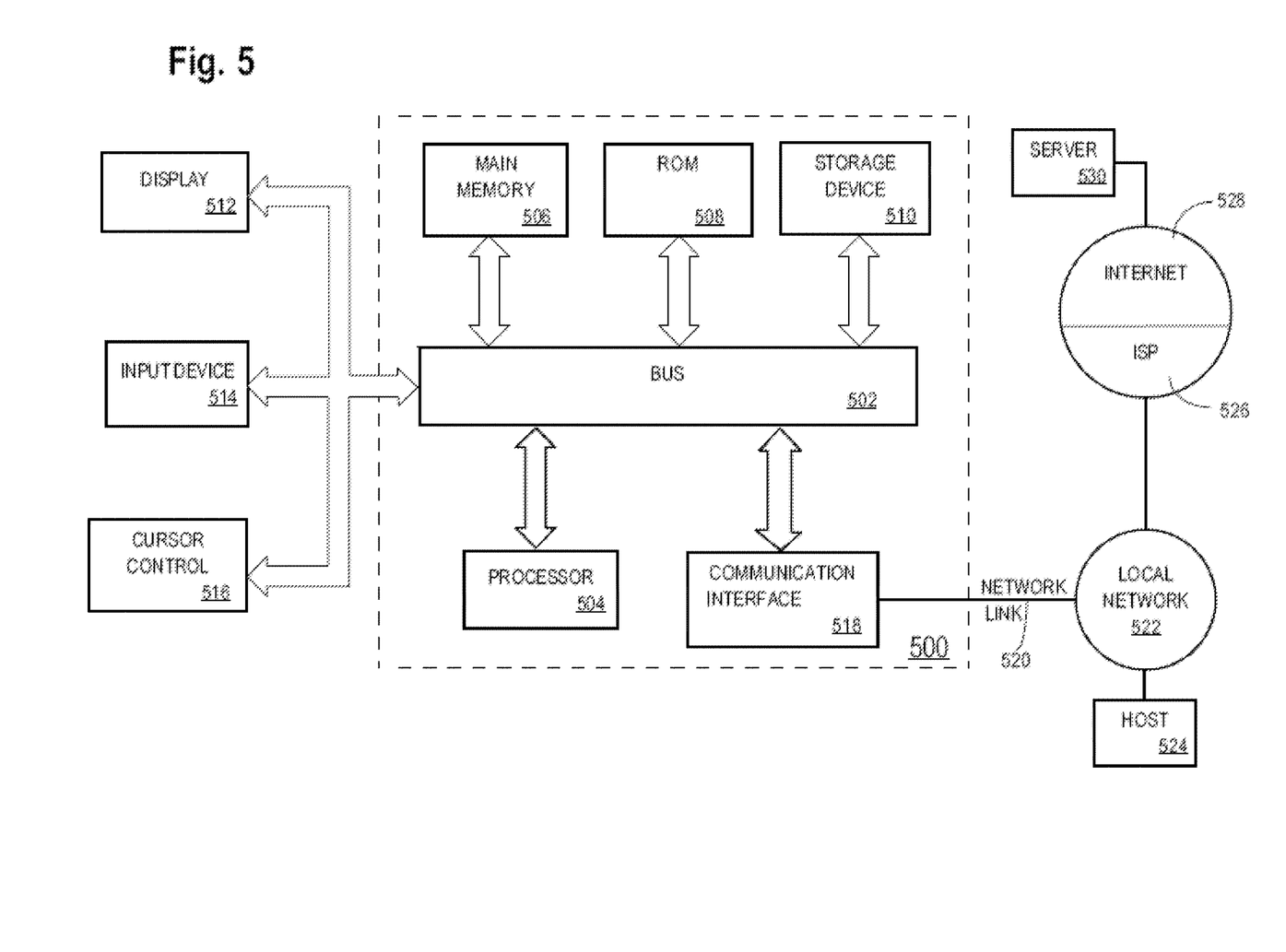
FIG. 5 is a block diagram of a computing device upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
 receiving, by a storage node, a request from a database server, wherein the storage node comprises a cell server and a plurality of offload groups, wherein the database server is associated with a database version, wherein each offload group of said plurality of offload groups comprises respective one or more offload servers of a plurality of offload servers, wherein the request comprises information indicating a particular database version, and wherein each offload server of said plurality of offload servers is configured to service requests from a respective database version; and
 processing the request by:
  retrieving one or more data blocks from a storage device;
  selecting a particular offload group of the plurality of offload groups based on one or more characteristics associated with the request, wherein at least one characteristic comprises said particular database version;
  causing the one or more data blocks to be processed by the particular offload group; and
  sending data from the one or more data blocks to the database server once said one or more data blocks are processed by the particular offload group;
 wherein the method is performed by one or more computing devices.

2. The method of claim 1, wherein the request identifies one or more operations to be performed on the one or more data blocks by the particular offload group.

3. The method of claim 1, wherein the one or more characteristics further includes a database session associated with the request.

4. The method of claim 1, wherein the one or more characteristics further includes a user generating the request.

5. The method of claim 1, further comprising:
 wherein the request is a first request, the database server is a first database server, the one or more data blocks are one or more first data blocks, and the particular offload group is a first particular offload group;
 receiving, by the storage node, a second request from a second database server; and
 processing the second request by:
  retrieving one or more second data blocks;
  determining, based on one or more characteristics associated with the second request, whether the request is associated with the first particular offload group or a second particular offload group;
  responsive to determining that the second request is associated with the second particular offload group, causing the one or more second data blocks to be processed by the second particular offload group; and
  sending data from the one or more second data blocks to the second database server once said one or more data blocks are processed by the second particular offload group.

6. The method of claim 1, wherein the particular offload group is associated with a protected set of memory.

7. The method of claim 1, wherein the one or more data blocks represent a plurality of rows of a database table, and wherein causing the one or more data blocks to be processed by the particular offload group comprises filtering one or more of the plurality of rows of the database table.

8. A non-transitory computer-readable media storing instructions which, when executed by one or more processors, cause:
 receiving, by a storage node, a request from a database server, wherein the storage node comprises a cell server and a plurality of offload groups, wherein the database server is associated with a database version, wherein each offload group of said plurality of offload groups comprises respective one or more offload servers of a plurality of offload servers, wherein the request comprises information indicating a particular database version, and wherein each offload server of said plurality of offload servers is configured to service requests from a respective database version; and
 processing the request by:
  retrieving one or more data blocks from a storage device;
  selecting a particular offload group of the plurality of offload groups based on one or more characteristics associated with the request, wherein at least one characteristic of said one or more characteristics comprises the said particular database version;
  causing the one or more data blocks to be processed by the particular offload group; and
  sending data from the one or more data blocks to the database server once said one or more data blocks are processed by the particular offload group.

9. The non-transitory computer-readable medium of claim 8, wherein the request is a smart request identifying operations to be performed by the particular offload group.

10. The non-transitory computer-readable medium of claim 8, wherein the one or more characteristics further includes a database session associated with the request.

11. The non-transitory computer-readable medium of claim 8, wherein the one or more characteristics further includes a user generating the request.

12. The non-transitory computer-readable medium of claim 8, wherein the request is a first request, the database server is a first database server, the one or more data blocks are one or more first data blocks, and the particular offload group is a first particular offload group; and wherein the instructions include instructions that, when executed by said one or more processors, causes:
 receiving, by the storage node, a second request from a second database server; and
 processing the second request by:
  retrieving one or more second data blocks;
  determining, based on one or more characteristics associated with the second request, whether the request is associated with the first particular offload group or a second particular offload group;
  responsive to determining that the second request is associated with the second particular offload group, causing the one or more second data blocks to be processed by the second particular offload group; and
  sending data from the one or more second data blocks to the second database server once said one or more data blocks are processed by the second particular offload group.

13. The non-transitory computer-readable medium of claim 8, wherein the particular offload group is associated with a protected set of memory.

14. The non-transitory computer-readable medium of claim 8, wherein the one or more data blocks represent a plurality of rows of a database table, and wherein causing the one or more data blocks to be processed by the particular offload group comprises filtering one or more of the plurality of rows of the database table.

15. The method of claim 1, wherein the particular offload group is configured with debugging functionality.

16. The non-transitory computer-readable storage medium of claim 8, wherein the particular offload group is configured with debugging functionality.

* * * * *